Figure 1:
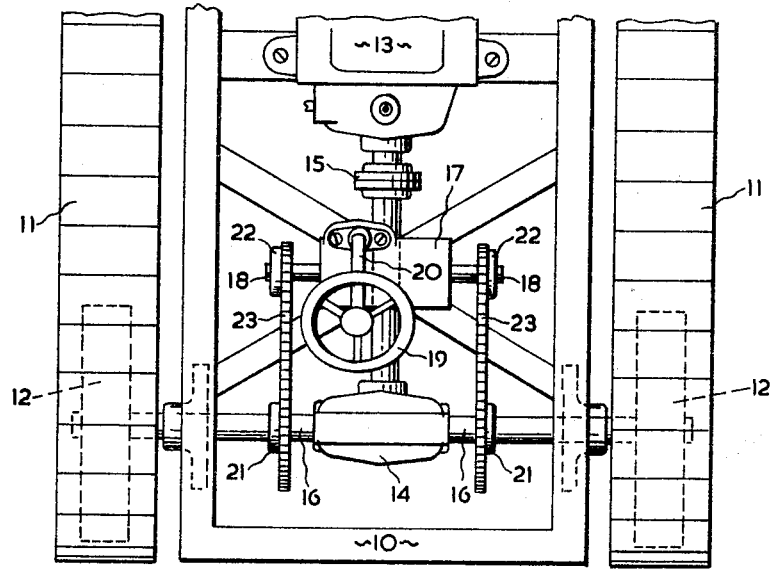

Aug. 30, 1966  A. G. FISHER  3,269,218
STEERING MECHANISMS
Filed May 11, 1964  4 Sheets-Sheet 1

INVENTOR
A. GORDON FISHER
BY: Church & Rogers
PATENT AGENTS

Aug. 30, 1966     A. G. FISHER     3,269,218
STEERING MECHANISMS

Filed May 11, 1964     4 Sheets-Sheet 3

INVENTOR
A. GORDON FISHER
BY: Church & Rogers
PATENT AGENTS

Aug. 30, 1966  A. G. FISHER  3,269,218
STEERING MECHANISMS
Filed May 11, 1964
4 Sheets-Sheet 4

INVENTOR
A. GORDON FISHER
BY: Church & Rogers
PATENT AGENTS

United States Patent Office 3,269,218
Patented August 30, 1966

3,269,218
STEERING MECHANISMS
Alfred G. Fisher, 1152 Linbrook Road, Oakville,
Ontario, Canada
Filed May 11, 1964, Ser. No. 366,243
17 Claims. (Cl. 74—720.5)

This invention is concerned with improvements in or relating to steering mechanisms for vehicles, such as tractors, tanks and automobiles, and especially, but not exclusively, to such mechanisms for vehicles of the endless track type.

It is a common practice with certain types of vehicles, especially those of the endless track type, to steer the vehicle by causing two driving wheels thereof on opposite sides of the vehicle to rotate at different speeds. In one such system commonly used a brake is provided in each drive from the engine to a drive wheel, and steering is effected by applying one of the brakes and slowing the associated drive wheel. In another system a speed change gear is provided in each drive, and the required speed difference is obtained by changing the gear ratios. It has also been proposed hitherto to provide a steering mechanism for such a vehicle comprising a second differential gear connected in parallel with the main differential gear which connects the engine and the steering driving wheels; in such a system rotation of the steering wheel causes operation of a motor connected to a member of the second differential gear, the rotation of this motor being transmitted by the second differential gear to the output shafts of the main differential gear so that one output shaft has its speed increased and the other has its speed reduced.

It is an object of the present invention to provide a new steering system for vehicles.

It is a particular object of the invention to provide a new steering system for vehicles of the endless track type.

According to the present invention there is provided a vehicle steering system comprising a differential gear having an input member for connection to a power source and two output members connected for differential rotation by the gear, two vehicle driving members operatively connected respectively to the said two output members, a differential gear or variable ratio device having two output members, and means operatively connecting the said device members respectively to the two differential gear output members. Preferably the last-mentioned connecting means comprises respective torque reduction means.

Figure 2:
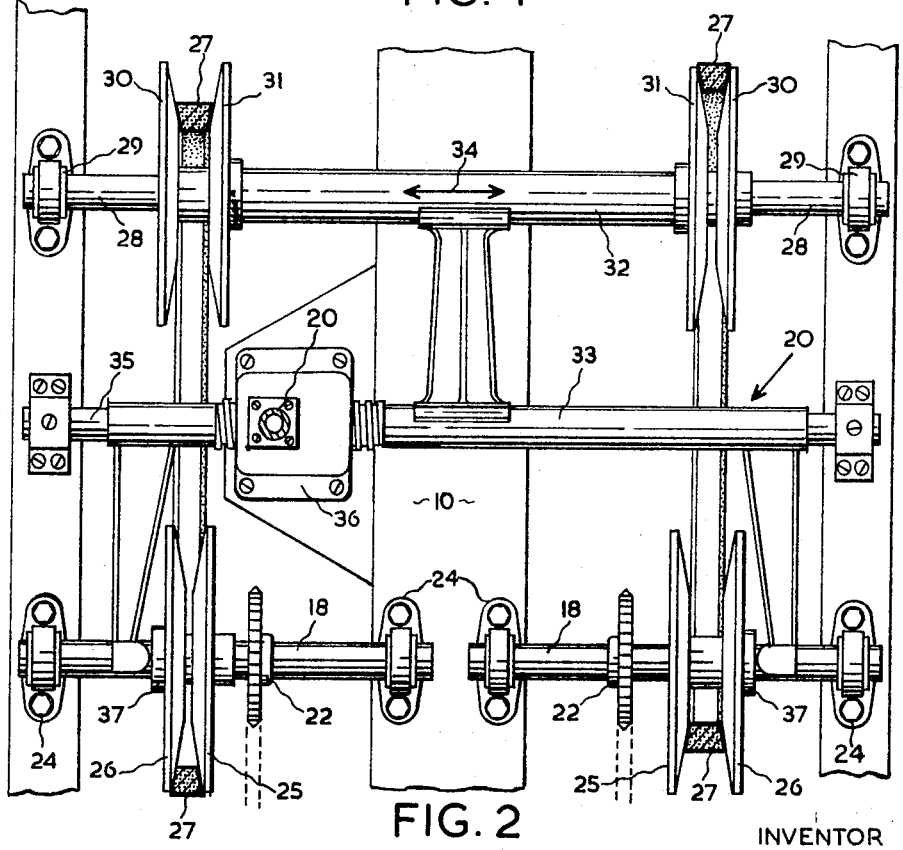
Figure 3:
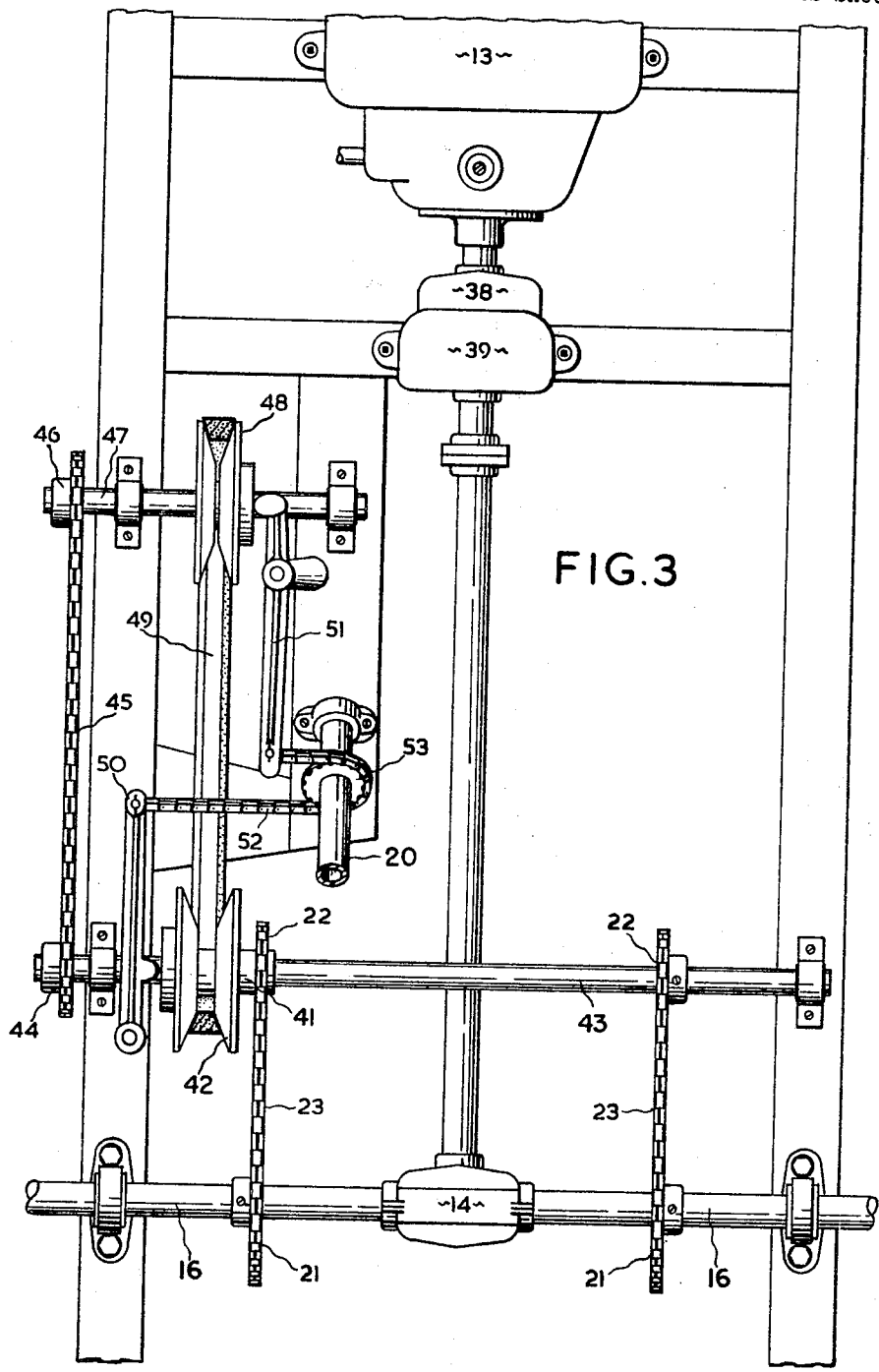
Figure 4:
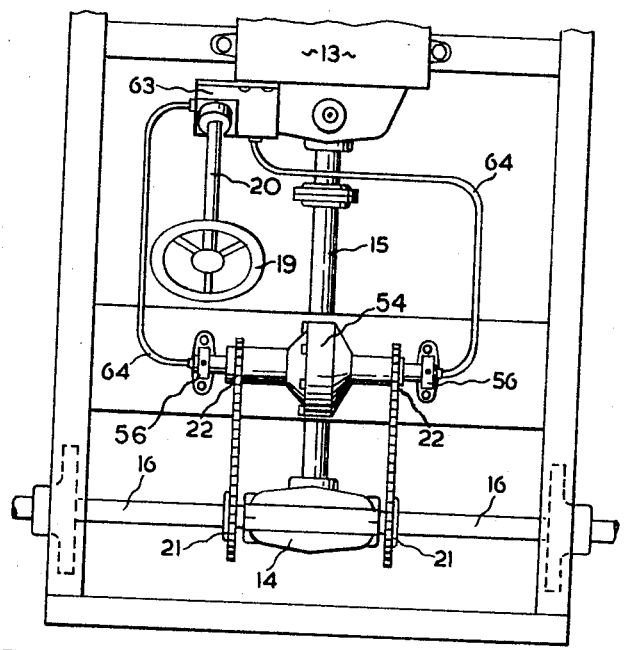
Figure 5:
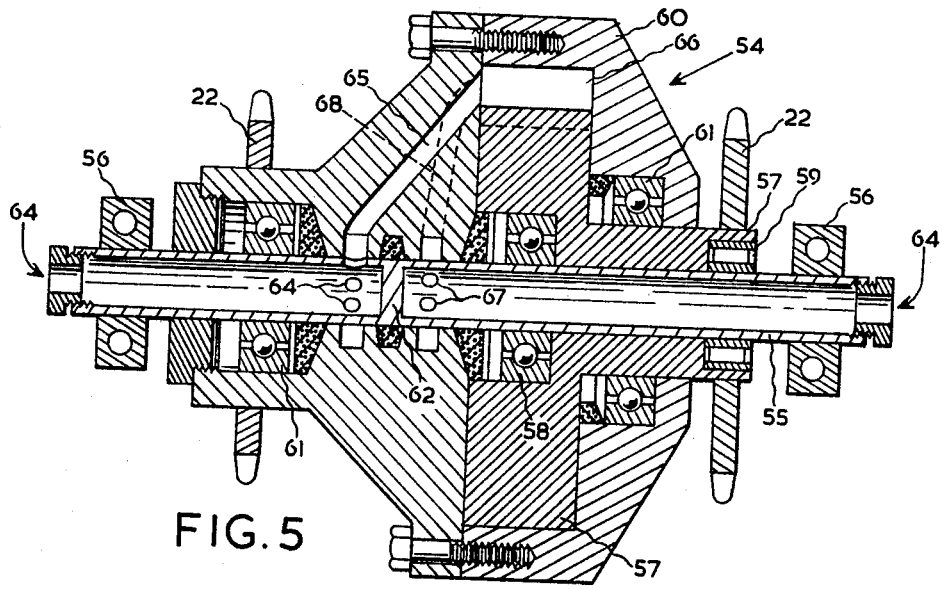
Figure 6:
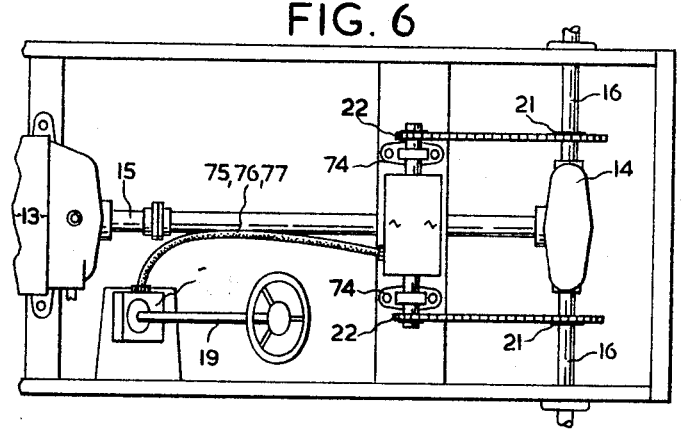
Figure 7:
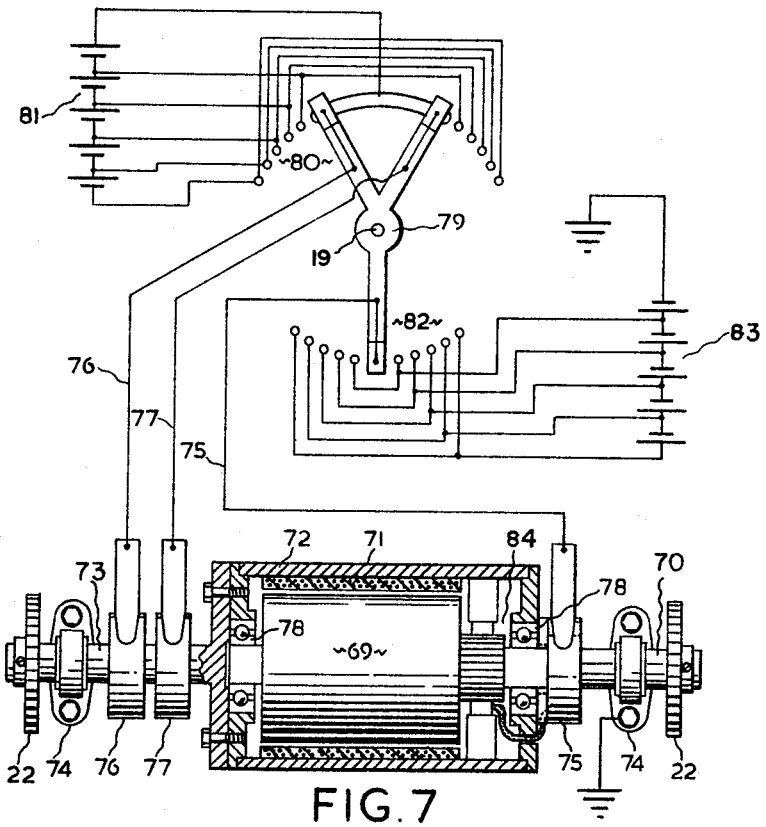

Specific embodiments of the invention will now be described, by way of example, with reference to the accompanying diagrammatic drawings wherein:

FIGURE 1 is a schematic view of a steering system for an endless track vehicle,

FIGURE 2 is a similar view of a mechanical variable ratio device for use in a system as in FIGURE 1, FIGURE 3 is a similiar view to FIGURE 1, and showing in detail another form of mechanical, variable-ratio device, FIGURE 4 is a similar view to FIGURE 1 of a system employing a hydraulic variable-ratio device, FIGURE 5 is a longitudinal cross-sectional view of the hydraulic device of the system of FIGURE 4, FIGURE 6 is a similar view to FIGURE 4 of a system employing an electric variable-ratio device, and, FIGURE 7 is partly schematic and partly a longitudinal cross-sectional view of the electric device of the system of FIGURE 6.

Wherever possible the same parts are given the same reference numeral in all the figures of the drawing.

Referring now to FIGURE 1, there is illustrated therein a vehicle 10 which moves on two endless tracks 11 driven by respective drive wheels 12. The wheels 12 are in turn driven by an engine 13, via a differential gear 14 having an input shaft 15 operatively connecting together the gear and the engine, and ouptut shafts 16 respectively operatively connecting together the gear and the drive wheels 12. A variable ratio device 17 has two shafts 18 whose relative speeds of rotation can be varied by rotation of a steering wheel 19, illustrated herein as coupled directly to a ratio-changing operating member 20 of the device 17. Each shaft 18 is operatively connected to the respective output shaft 16 by a torque-reducing, speed-multiplying mechanical connection, illustrated herein as sprocket pinions 21 fixed to their respective shafts 16 to rotate therewith, sprocket pinions 22 fixed to their respective shafts 18 to rotate therewith, and respective flexible connecting driving chains 23, the pinions 21 being of larger diameter than the pinions 22.

With the member 20 set by the steering wheel 19 to give a ratio of 1:1 then the device 17 will have no effect upon the rotation of the output shafts 16, and the vehicle will steer a straight course. With the device set at any other ratio one of the shafts 16 will rotate at a lower speed than the other shaft 16, and the vehicle will steer in the corresponding direction. One effect of the device is to transfer power from the lower speed shaft 16 to the higher speed shaft, so that there is a minimum loss of power. Because of the torque-reducing, speed-multiplying connections to the gear device 17, the torques that must be handled by that device are a fraction only of the torques transmitted by the shafts 16 to the wheels 12, and it can be correspondingly lighter and cheaper in construction.

Referring now to FIGURE 2, there is shown therein a mechanical construction for the device 17, in which each shaft 18 carrying a sprocket pinion 22 is mounted in respective bearings 24. The shafts 18 also carry respective variable diameter pulleys constituted by pulley members 25 fixed to the shafts, and pulley members 26 slidable axially along the shafts. Each pulley is connected by a V-section, drive belt 27 to a corresponding lay pulley on a lay-shaft 28 carried in bearings 29. Each lay pulley comprises a member 30 fixed to the shaft 28, and another member 31 slidable axially relative thereto, the two members 31 being connected rigidly together to move as a unit by a connecting member 32 encircling and slidable axially on the shaft 28.

The ratio-changing member 20 for this device comprises a three-armed frame 33, which is moved back and forth, in the direction of the arrows 34, on a shaft 35 upon rotation of the member 20 by the steering wheel (not shown), the member 20 in this embodiment being the input member of a steering box 36 mounted on the vehicle frame 10 and connected by a screw thread with the frame 33. It will be understood that instead of the steering box 36 any other suitable means may be employed for connecting the steering wheel and the frame 33. One arm of the member 33 is fixed to the connecting member 32 and moves it axially of the shaft 28 as the frame is moved. The other two arms each control the movement of a respective one of the two movable pulley members 26, the movement of the arm being transmitted to the pulley member via a respective thrust bearing 37. There is a median position of the member 32 at which the speed ratio between the shafts 18 is 1:1. If, for example, the member 32 is moved to the right as seen in FIGURE 2 then the left drive pulley on the shaft 18 and the right lay pulley increase their effective diameters, while the left lay pulley and the right drive pulley decrease their effective diameters, so that the lay shaft 28 rotates faster than the left hand shaft 18, and the right hand shaft 18 rotates faster than both the lay shaft 28 and the left hand drive shaft. Similarly, if the frame 33 moves to the left, the speed of the left hand drive shaft is increased relative to the lay shaft, and relative to the right hand drive shaft.

In the vehicle steering system shown in FIGURE 3, the variable ratio device is constituted by a single pair of variable diameter pulleys. In this embodiment the motor 13 drives the differential gear 14 via a centrifugal clutch 38 and a hydraulic torque converter 39, the two main drive wheels 12 not being shown. One of the sprocket pinions 22 is connected directly to the fixed pulley member 41 of a variable diameter pulley 42, while the other sprocket pinion 22 is mounted on a shaft 43 that extends through the pulley 42 and carries the pulley for free rotation thereon, the shaft having a sprocket pinion 44 fixed to the left hand end thereof. The pinion 44 drives via a connecting chain 45 a sprocket pinion 46 mounted on a shaft 47, which shaft has fixed thereto the fixed pulley member of the other variable diameter pulley 48 and carries the movable pulley member of the same pulley for axial sliding movement. The pulleys 41 and 48 are connected by a V-section drive belt 49, and it will be seen that the two pinions 22 can only rotate at the same speed while the pulleys 41 and 48 have the same effective diameters, and the gear device consequently has the ratio 1:1.

In this embodiment ratio-changing means comprises pivoted arms 50 and 51 associated respectively with the pulleys 41 and 48, the free ends of the levers being connected by a drive chain 52 passing over a sprocket pinion 53 that is mounted on the member 20 for rotation by the steering wheel (not shown). If, for example, the sprocket rotates to move the associated end of the lever 50 to the right (as seen in FIGURE 3) then the other end of the lever 51 moves to the left and the effective diameter of the pulley 48 increases; at the same time the whole lever 50 moves to the left, decreasing the effective diameter of the pulley 41, so that the pulley 41 rotates faster than the pulley 48, rotating the left hand sprocket pinions 22 and 21 faster than the corresponding right hand pinions.

Although in the embodiments so far described a mechanical variable ratio gear is employed, it is also possible to employ a hydraulic motor device giving the same effect as a differential gear, and such an embodiment is illustrated in FIGURE 4. The device 54 comprises a fixed hollow shaft 55 mounted in brackets 56 and having the motor rotor 57 mounted for free rotation thereon by a ball bearing 58 and a roller bearing 59. The motor casing 60 is mounted for free rotation relative to the shaft 55 and the rotor 57 by means of ball bearings 61. The right hand pinion 22 is fast with the rotor 57, while the left hand pinion 22 is fast with the casing 60. A partition 62 divides the interior of the hollow shaft into two compartments. A hydraulic working fluid such as oil can be supplied at will by the operator to either end of the hollow shaft, the means for supplying the fluid being illustrated herein as a pump 63 driven by the motor 13 and connected by pipes 64 to the ends of the hollow shaft 55. The fluid under pressure supplied to the left hand end of the shaft 55 is fed via ports 64 and passages 65 to the working chamber 66 of the motor and causes relative rotation between the rotor 57 and the casing 60 in one direction. Fluid supplied to the right hand shaft end is fed via ports 67 and passages 68 to the working chamber to cause relative rotation of the rotor and casing in the opposite direction. If no fluid is supplied to the motor device then the rotor and casing can rotate freely relative to one another, giving the effect of a gear device of ratio 1:1. The ratio-controlling member 20 operates to control the rate and direction of flow of the working fluid supplied by the pump. The pump 63 can be of the variable delivery type with the member 19 controlling the pump member that determines its delivery direction and delivery rate, or the pump can be fixed delivery type, with the member 19 controlling an associated valve that determines the rate and the direction of delivery of the working fluid.

In the embodiment illustrated by FIGURE 6 an electric motor differential device is provided comprising a reversible electric motor having an armature 69 mounted on a shaft 70, and a field winding 71 mounted in a casing 72. The left hand end of the casing has a stub shaft 73 fastened thereto, the stub shaft being mounted in a bearing 74 and carrying two slip rings 76 and 77 and the left hand sprocket pinion 22. The right hand end of the casing carries a further slip ring 75 and another bearing 74, the said other bearing also serving as an earth return for the armature winding circuit. The shaft 70 is mounted for rotation relative to the casing by two ball-bearings 78 and carries the right hand sprocket pinion 22. If no energising current is fed to the motor, the casing and the armature can rotate freely relative to one another, giving the effect of a gear ratio of 1:1. The ratio-changing means in this embodiment comprises a switch 79 rotated by the member 19, the switch having a portion 80 for supplying a reversible, variable-magnitude voltage from a battery 81 to the slip rings 76 and 77, and thence to the field winding 71, and a portion 82 for supplying at the same time a unidirectional, variable-magnitude voltage from a battery 83 to the slip ring 75 and thence via brushes 84 to the armature winding. The direction of steering depends upon the direction of the relative rotation between the armature and casing, and thus upon the direction of flow of the current in the field winding, while the rate of steering depends upon the speed of such relative rotation, and thus upon the magnitudes of the voltages applied to the armature and field windings. It will be apparent that in other embodiments the armature winding can be supplied with the reversible voltage. In a further embodiment the voltage to one winding is kept substantially constant and the other voltage only varied. It will be apparent that both windings can be supplied from the same power source.

It will be understood that the embodiments described are illustrative only of the invention and that variations thereof within the scope of the appended claims will be apparent to those skilled in the art.

What I claim is:

1. A vehicle steering system comprising a differential gear having an input member for connection to a power source and two output members connected for differential rotation by the gear, two vehicle driving members which are operatively connected respectively to the said two output members and which rotate at different speeds for steering the vehicle on other than a straight course, a variable speed ratio device having two device members and means for changing the relative speed of rotation of the said device members, means operatively connecting the said device members respectively to the two differential gear output members, and vehicle steering means operatively connected to the variable ratio device for changing the relative speed of rotation of said device members.

2. A vehicle steering system comprising a differential gear having an input member for connection to a power source and two output members connected for differential rotation by the gear, two vehicle driving members which are operatively connected respectively to the said two output members and which rotate at different speeds for steering the vehicle on other than a straight course, a variable speed ratio device having two device members and means for changing the relative speeds of rotation of the said device members, a first torque reduction means operatively connecting one of said device members to a respective differential gear output member, a second torque reduction means operatively connecting the other of said variable device members to the other differential gear output member, whereby when the ratio of the said device is changed from the value corresponding to straight course steering power is transmitted from one of the two differential gear output members through the respective torque reduction means to the respective device member, through the said device to the other device member, and from the last-mentioned device member through the respective torque reduction means to the other differential gear output member, and vehicle steering means operatively connected to the variable ratio device for changing the relative speed of rotation of said device members.

3. A vehicle steering system comprising a differential gear having an input member for connection to a power source and two output members connected for differential rotation by the gear, two vehicle driving members which are operatively connected respectively to the said two output members and which rotate at different speeds for steering the vehicle on other than a straight course, a second differential device having two output members capable of differential rotation relative to one another, a first torque reduction means operatively connecting one of said differential device output members to a respective differential gear output member, and a second torque reduction means operatively connecting the other of said differential device output members to the other differential gear output member, whereby when the vehicle steers on other than a straight course steering power is transmitted between the two differential gear output members through the said first and second torque reduction means and the said second differential gear output members through the said first and second torque reduction means and the said second differential device.

4. A vehicle steering system as claimed in claim 1, wherein the said variable ratio device comprises a reversible hydraulic motor, means for feeding working fluid to the motor to cause relative rotation of the output members in one direction of rotation, and means for alternatively feeding working fluid to the motor to cause relative rotation of the output members in the opposite direction of rotation.

5. A vehicle steering system as claimed in claim 2, wherein the said variable ratio device comprises a reversible hydraulic motor, means for feeding working fluid to the motor to cause relative rotation of the output members in one direction of rotation, and means for alternatively feeding working fluid to the motor to cause relative rotation of the output members in the opposite direction of rotation.

6. A vehicle steering system as claimed in claim 3, wherein the said second differential device comprises a reversible hydraulic motor, means for feeding working fluid to the motor to cause relative rotation of the output members in one direction of rotation, and means for alternatively feeding working fluid to the motor to cause relative rotation of the output members in the opposite direction of rotation.

7. A vehicle steering system as claimed in claim 1, wehrein the said variable ratio device comprises a reversible electric motor, means for feeding operating current to the motor to cause relative rotation of the output members in one direction of rotation, and means for alternatively feeding operating current thereto to cause relative rotation of the output members in the opposite direction of rotation.

8. A vehicle steering system as claimed in claim 2, wherein the said variable ratio device comprises a reversible electric motor, means for feeding operating current to the motor to cause relative rotation of the output members in one direction of rotation, and means for alternatively feeding operating current thereto to cause relative rotation of the output members in the opposite direction of rotation.

9. A vehicle steering system as claimed in claim 3, wherein the said second differential device comprises a reversible electric motor, means for feeding operating current to the motor to cause relative rotation of the output members in one direction of rotation, and means for alternatively feeding operating current thereto to cause relative rotation of the output members in the opposite direction of rotation.

10. A vehicle steering system comprising a differential gear having an input member for connection to an engine and two output members connected for differential relative rotation, two vehicle driving members which are operatively connected respectively to the said two output members and which rotate at different speeds for steering the vehicle on other than a straight course, a first shaft, a second shaft, first means operatively connecting one of the said output members and the first shaft, second means operatively connecting the other of the said output members and the second shaft, a first variable diameter pulley rotatable with the first shaft, a second variable diameter pulley rotatable with the second shaft, flexible endless belt means operatively connecting said variable diameter pulleys to constitute a variable ratio gear device, and means operatively connected to the said variable diameter pulleys for changing their effective diameters and thereby changing the gear ratio of the said variable ratio device.

11. A vehicle steering system as claimed in claim 10, wherein the said first and second means operatively connecting respectively said output members, whereby when the ratio of the said device is changed from the value corresponding to straight course steering power is transmitted from one of the two differential gear output members to the respective device member, through the said device to the other device member, and from the last-mentioned device member to the other differential gear output member, and said first and second shafts comprise torque reduction means.

12. A vehicle steering system as claimed in claim 11, and comprising a lay shaft, two variable diameter pulleys mounted on the lay shaft for rotation therewith, movable means connecting the said pulleys for varying differentially their effective diameters, flexible endless belt means connecting the pulley of the first shaft and one of the lay shaft pulleys, and flexible endless belt means connecting the pulley of the second shaft and the other of the pulleys of the lay shaft.

13. A vehicle steering system as claimed in claim 10, and comprising a lay shaft, two variable diameter pulleys mounted on the lay shaft for rotation therewith, movable means connecting the said pulleys for varying differentially their effective diameters, flexible endless belt means connecting the pulley of the first shaft and one of the lay shaft pulleys, and flexible endless belt means connecting the pulley of the second shaft and the other of the pulleys of the lay shaft.

14. A vehicle steering system comprising a differential gear having an input member for connection to an engine and two output members connected for differential relative rotation, two vehicle driving members which are operatively connected respectively to the said two output members and which rotate at different speeds for steering the vehicle on other than a straight course, a reversible hydraulic motor comprising a hollow shaft, a rotor rotatable relative to the shaft, a casing rotatable relative to the shaft and the rotor and providing a working chamber between itself and the rotor, first duct means from said hollow shaft to the working chamber for feeding fluid to the working chamber to rotate the rotor and the casing relative to one another in one direction, second duct means from said hollow shaft to the working chamber for feeding working fluid to the working chamber to rotate the rotor and the casing relative to one another in the opposite direction, means operatively connecting for rotation one of the said differential gear output members and the motor rotor, and means operatively connecting for rotation the other of the said differential gear output members and the motor casing.

15. A vehicle steering system as claimed in claim 14, and comprising torque reduction means operatively connecting said differential gear output members and respectively the motor rotor and the motor casing.

16. A vehicle steering system comprising a differential gear having an input member for connection to an engine and two output members connected for differential relative rotation, two vehicle driving members which are operatively connected respectively to the said two output members and which rotate at different speeds for steering the vehicle on other than a straight course, a reversible electric motor comprising bearing means, a motor casing rotatably mounted in said bearing means, a field winding carried by said casing, an armature rotatable relative to said casing, an armature winding carried by said armature, means for feeding operating current to the field and armature windings to cause relative rotation of the casing and the armature in a first direction of relative rotation, means for feeding operating current alternatively to the field and armature windings to cause relative rotation of the casing and the armature in the opposite direction of relative rotation, means operatively connecting for rotation one of the said differential gear output members and the casing, and means operatively connecting for rotation the other of the said differential gear output members and the armature.

17. A vehicle steering system as claimed in claim 16, and comprising torque reduction means operatively connecting the said output members and respectively the said casing and the armature.

References Cited by the Examiner
UNITED STATES PATENTS

| | | | |
|---|---|---|---|
| 2,332,838 | 10/1943 | Borgward | 74—720.5 |
| 2,730,182 | 1/1956 | Sloane | 74—710.5 X |
| 2,874,591 | 2/1959 | Thoma | 74—710.5 X |
| 2,878,690 | 3/1959 | Capron et al. | 74—722 X |
| 3,081,647 | 3/1963 | Blenkle | 74—720.5 X |

DAVID J. WILLIAMOWSKY, *Primary Examiner.*

DON A. WAITE, *Examiner.*

R. J. BIRD, L. H. GERIN, *Assistant Examiners.*